United States Patent
Catherwood (10) Patent No.: US 7,243,372 B2
(45) Date of Patent: *Jul. 10, 2007

(54) MODIFIED HARVARD ARCHITECTURE PROCESSOR HAVING DATA MEMORY SPACE MAPPED TO PROGRAM MEMORY SPACE WITH ERRONEOUS EXECUTION PROTECTION

(75) Inventor: Michael Catherwood, Pepperell, MA (US)

(73) Assignee: Microchip Technology Incorporated, Chandler, AZ (US)

( * ) Notice: Subject to any disclaimer, the term of this patent is extended or adjusted under 35 U.S.C. 154(b) by 24 days.

This patent is subject to a terminal disclaimer.

(21) Appl. No.: 11/135,527

(22) Filed: May 23, 2005

(65) Prior Publication Data

US 2005/0210284 A1    Sep. 22, 2005

Related U.S. Application Data

(63) Continuation of application No. 09/870,460, filed on Jun. 1, 2001, now Pat. No. 7,007,172.

(51) Int. Cl.
*H04L 9/00* (2006.01)
*G06F 11/00* (2006.01)
*G06F 12/00* (2006.01)

(52) U.S. Cl. ............................ 726/23; 714/35; 714/38
(58) Field of Classification Search .................... None
See application file for complete search history.

(56) References Cited

U.S. PATENT DOCUMENTS 3,771,146 A    11/1973   Cottton et al. .............. 710/260

(Continued)

FOREIGN PATENT DOCUMENTS

EP    0 554 917 A2    8/1993

(Continued)

OTHER PUBLICATIONS

Moon B I et al.: "A 32-bit RISC Microprocessor with DSP Functionality: Rapid Prototyping" IEICE Transactions on Fundamentals of Electronics, Communications and Computer Sciences, Institute of Electronics Information and Comm. Eng. Tokyo, JP, vol. E84-A No. 5, pp. 1339-1347, XP001060025 ISSN: 0916-8508, May 2001.

(Continued)

*Primary Examiner*—Christopher Revak
(74) *Attorney, Agent, or Firm*—Baker Botts L.L.P.

(57) ABSTRACT

A processor has an architecture that provides the processing speed advantages of the Harvard architecture, but does not require two separate external memories in order to expand both data memory and program instruction memory. The processor has separate program memory space and data memory space, but provides the capability to map at least a portion of the program memory space to the data memory space. This allows most program instructions that are processed to obtain the speed advantages of simultaneous program instruction and data access. It also allows program memory space and data memory space to be expanded externally to the processor using only one external memory device that includes both program instructions and data. The processor includes a program memory space operable to store program instructions and data, a data memory space operable to store data, and mapping circuitry operable to map at least a portion of the program memory space to the data memory space. The program memory space may be internal to the processor. The processor may further comprise a page register operable to specify a location of the program memory space that is mapped to the data memory space.

10 Claims, 6 Drawing Sheets

U.S. PATENT DOCUMENTS

| | | | |
|---|---|---|---|
| 3,781,810 A | 12/1973 | Downing | 340/172.5 |
| 3,886,524 A | 5/1975 | Appelt | 710/110 |
| 3,930,253 A | 12/1975 | Maida | 340/347 |
| 4,025,771 A | 5/1977 | Lynch, Jr. et al. | 708/521 |
| 4,074,353 A | 2/1978 | Woods et al. | 710/264 |
| 4,090,250 A | 5/1978 | Carlson et al. | 712/234 |
| 4,323,981 A | 4/1982 | Nakamura | 364/749 |
| 4,379,338 A | 4/1983 | Nishitani et al. | 708/552 |
| 4,398,244 A | 8/1983 | Chu et al. | 364/200 |
| 4,408,274 A | 10/1983 | Wheatley et al. | 364/200 |
| 4,451,885 A | 5/1984 | Gerson et al. | 708/200 |
| 4,472,788 A | 9/1984 | Yamazaki | 364/900 |
| 4,481,576 A | 11/1984 | Bicknell | 364/200 |
| 4,488,252 A | 12/1984 | Vassar | 364/748 |
| 4,511,990 A | 4/1985 | Hagiwara et al. | 364/748 |
| 4,556,938 A | 12/1985 | Parker et al. | 364/200 |
| 4,615,005 A | 9/1986 | Maejima et al. | 713/601 |
| 4,626,988 A | 12/1986 | George | 364/200 |
| 4,709,324 A | 11/1987 | Kloker | 364/200 |
| 4,730,248 A | 3/1988 | Watanabe et al. | 364/200 |
| 4,742,479 A | 5/1988 | Kloker et al. | 364/746 |
| 4,768,149 A | 8/1988 | Konopik et al. | 364/200 |
| 4,779,191 A | 10/1988 | Greenblatt | 711/2 |
| 4,782,457 A | 11/1988 | Cline | 364/715.04 |
| 4,800,524 A | 1/1989 | Roesgen | 364/900 |
| 4,807,172 A | 2/1989 | Nukiyama | 364/715.08 |
| 4,829,420 A | 5/1989 | Stahle | 364/200 |
| 4,829,460 A | 5/1989 | Ito | 364/715.08 |
| 4,839,846 A | 6/1989 | Hirose et al. | 364/748 |
| 4,841,468 A | 6/1989 | Miller et al. | 708/625 |
| 4,872,128 A | 10/1989 | Shimizu | 364/715.08 |
| 4,882,701 A | 11/1989 | Ishii | 364/900 |
| 4,926,371 A | 5/1990 | Vassilliadis et al. | 708/628 |
| 4,941,120 A | 7/1990 | Brown et al. | 364/748 |
| 4,943,940 A | 7/1990 | New | 364/748 |
| 4,945,507 A | 7/1990 | Ishida et al. | 708/530 |
| 4,959,776 A | 9/1990 | Deerfield et al. | 364/200 |
| 4,977,533 A | 12/1990 | Miyabayashi et al. | 364/726 |
| 4,984,213 A | 1/1991 | Abdoo et al. | 365/230.03 |
| 5,007,020 A | 4/1991 | Inskeep | 364/900 |
| 5,012,441 A | 4/1991 | Retter | 364/900 |
| 5,032,986 A | 7/1991 | Pathak et al. | 364/200 |
| 5,034,887 A | 7/1991 | Yasui et al. | 364/200 |
| 5,038,310 A | 8/1991 | Akagiri et al. | 364/715.04 |
| 5,040,178 A | 8/1991 | Lindsay et al. | 371/21.5 |
| 5,056,004 A | 10/1991 | Ohde et al. | 264/200 |
| 5,099,445 A | 3/1992 | Studor et al. | 364/715.08 |
| 5,101,484 A | 3/1992 | Kohn | 395/375 |
| 5,117,498 A | 5/1992 | Miller et al. | 395/775 |
| 5,121,431 A | 6/1992 | Wiener | 713/174 |
| 5,122,981 A | 6/1992 | Taniguchi | 364/748 |
| 5,155,823 A | 10/1992 | Tsue | 395/400 |
| 5,177,373 A | 1/1993 | Nakamura | 307/265 |
| 5,197,023 A | 3/1993 | Nakayama | 364/748 |
| 5,197,140 A | 3/1993 | Balmer | 395/400 |
| 5,206,940 A | 4/1993 | Murakami et al. | 395/400 |
| 5,212,662 A | 5/1993 | Cocanougher et al. | 364/748 |
| 5,218,239 A | 6/1993 | Boomer | 307/443 |
| 5,239,654 A | 8/1993 | Ing-Simmons et al. | 395/800 |
| 5,276,634 A | 1/1994 | Suzuki et al. | 364/748 |
| 5,282,153 A | 1/1994 | Bartkowiak et al. | 364/716 |
| 5,327,543 A | 7/1994 | Miura et al. | 395/375 |
| 5,327,566 A | 7/1994 | Forsyth | 395/775 |
| 5,375,080 A | 12/1994 | Davies | 364/736.5 |
| 5,379,240 A | 1/1995 | Byrne | 364/715.08 |
| 5,386,563 A | 1/1995 | Thomas | 395/650 |
| 5,392,435 A | 2/1995 | Masui et al. | 395/725 |
| 5,418,976 A | 5/1995 | Iida | 395/800 |
| 5,422,805 A | 6/1995 | McIntyre et al. | 708/625 |
| 5,432,943 A | 7/1995 | Mitsuishi | 395/725 |
| 5,448,703 A | 9/1995 | Amini et al. | 395/290 |
| 5,448,706 A | 9/1995 | Fleming et al. | 395/421.07 |
| 5,450,027 A | 9/1995 | Gabara | 326/98 |
| 5,463,749 A | 10/1995 | Wertheizer et al. | 395/437 |
| 5,469,377 A | 11/1995 | Amano | 364/748 |
| 5,471,600 A | 11/1995 | Nakamoto | 395/405 |
| 5,497,340 A | 3/1996 | Uramoto et al. | 364/745 |
| 5,499,380 A | 3/1996 | Iwata et al. | 395/800 |
| 5,504,916 A | 4/1996 | Murakami et al. | 395/800 |
| 5,517,436 A | 5/1996 | Andreas et al. | 364/736 |
| 5,525,874 A | 6/1996 | Mallarapu et al. | 318/254 |
| 5,548,544 A | 8/1996 | Matheny et al. | 364/745 |
| 5,561,384 A | 10/1996 | Reents et al. | 327/108 |
| 5,561,619 A | 10/1996 | Watanabe et al. | 364/736.5 |
| 5,564,028 A | 10/1996 | Swoboda et al. | 395/375 |
| 5,568,380 A | 10/1996 | Broadnax et al. | 364/184 |
| 5,568,412 A | 10/1996 | Han et al. | 364/748 |
| 5,596,760 A | 1/1997 | Ueda | 395/588 |
| 5,600,813 A | 2/1997 | Nakagawa et al. | 395/421.07 |
| 5,611,061 A | 3/1997 | Yasuda | 395/591 |
| 5,619,711 A | 4/1997 | Anderson | 395/800 |
| 5,623,646 A | 4/1997 | Clarke | 395/560 |
| 5,638,524 A | 6/1997 | Kiuchi et al. | 395/375 |
| 5,642,516 A | 6/1997 | Hedayat et al. | 395/733 |
| 5,649,146 A | 7/1997 | Riou | 395/421.07 |
| 5,651,121 A | 7/1997 | Davies | 395/376 |
| 5,657,484 A | 8/1997 | Scarra | 395/561 |
| 5,659,700 A | 8/1997 | Chen et al. | 395/421.07 |
| 5,682,339 A | 10/1997 | Tam | 364/715.08 |
| 5,689,693 A | 11/1997 | White | 395/565 |
| 5,694,350 A | 12/1997 | Wolrich et al. | 364/788 |
| 5,696,711 A | 12/1997 | Makineni | 364/748.03 |
| 5,701,493 A | 12/1997 | Jaggar | 395/734 |
| 5,706,460 A | 1/1998 | Craig et al. | 395/380 |
| 5,706,466 A | 1/1998 | Dockser | 395/452 |
| 5,715,470 A | 2/1998 | Asano et al. | 395/800 |
| 5,737,570 A | 4/1998 | Koch | 395/872 |
| 5,740,095 A | 4/1998 | Parant | 364/760 |
| 5,740,419 A | 4/1998 | Potter | 395/588 |
| 5,740,451 A | 4/1998 | Muraki et al. | 395/733 |
| 5,748,516 A | 5/1998 | Goddard et al. | 364/748.03 |
| 5,748,970 A | 5/1998 | Miyaji et al. | 395/733 |
| 5,764,555 A | 6/1998 | McPherson et al. | 364/748.03 |
| 5,765,216 A | 6/1998 | Weng et al. | 711/214 |
| 5,765,218 A | 6/1998 | Ozawa et al. | 711/219 |
| 5,774,711 A | 6/1998 | Henry et al. | 395/591 |
| 5,778,237 A | 7/1998 | Yamamoto et al. | 713/322 |
| 5,778,416 A | 7/1998 | Harrison et al. | 711/5 |
| 5,790,443 A | 8/1998 | Shen et al. | 364/746 |
| 5,808,926 A | 9/1998 | Gorshtein et al. | 364/748.11 |
| 5,812,439 A | 9/1998 | Hansen | 364/748.03 |
| 5,812,868 A | 9/1998 | Moyer et al. | 395/800.23 |
| 5,815,693 A | 9/1998 | McDermott et al. | 713/501 |
| 5,825,730 A | 10/1998 | Nishida et al. | 369/44.32 |
| 5,826,072 A | 10/1998 | Knapp et al. | 395/567 |
| 5,826,096 A | 10/1998 | Baxter | 395/800.24 |
| 5,828,875 A | 10/1998 | Halvarsson et al. | 395/588 |
| 5,862,065 A | 1/1999 | Muthusamy | 364/736.5 |
| 5,867,726 A | 2/1999 | Ohsuga et al. | 395/800.32 |
| 5,875,342 A | 2/1999 | Temple | 395/733 |
| 5,880,984 A | 3/1999 | Burchfiel et al. | 364/748.07 |
| 5,892,697 A | 4/1999 | Brakefield | 364/748.02 |
| 5,892,699 A | 4/1999 | Duncan et al. | 364/760.4 |
| 5,894,428 A | 4/1999 | Harada | 364/724.03 |
| 5,900,683 A | 5/1999 | Rinehart et al. | 307/126 |
| 5,909,385 A | 6/1999 | Nishiyama et al. | 364/760.03 |
| 5,917,741 A | 6/1999 | Ng | 364/748.03 |
| 5,918,252 A | 6/1999 | Chen et al. | 711/217 |
| 5,930,159 A | 7/1999 | Wong | 364/745.01 |
| 5,930,503 A | 7/1999 | Drees | 395/651 |
| 5,936,870 A | 8/1999 | Im | 364/745.03 |
| 5,937,199 A | 8/1999 | Temple | 395/335 |
| 5,938,759 A | 8/1999 | Kamijo | 712/209 |
| 5,941,940 A | 8/1999 | Prasad et al. | 708/523 |

| | | | |
|---|---|---|---|
| 5,943,249 A | 8/1999 | Handlogten | 364/748.02 |
| 5,944,816 A | 8/1999 | Dutton et al. | 712/215 |
| 5,951,627 A | 9/1999 | Kiamilev et al. | 708/404 |
| 5,951,679 A | 9/1999 | Anderson et al. | 712/241 |
| 5,974,549 A | 10/1999 | Golan | 713/200 |
| 5,978,825 A | 11/1999 | Divine et al. | 708/525 |
| 5,983,333 A | 11/1999 | Kolagotla et al. | 711/219 |
| 5,991,787 A | 11/1999 | Abel et al. | 708/400 |
| 5,991,868 A | 11/1999 | Kamiyama et al. | 712/32 |
| 5,996,067 A | 11/1999 | White | 712/224 |
| 6,009,454 A | 12/1999 | Dummermuth | 709/108 |
| 6,014,723 A | 1/2000 | Tremblay et al. | 711/1 |
| 6,018,757 A | 1/2000 | Wong | 708/525 |
| 6,026,489 A | 2/2000 | Wachi et al. | 712/241 |
| 6,044,392 A | 3/2000 | Anderson et al. | 708/551 |
| 6,044,434 A | 3/2000 | Oliver | 711/110 |
| 6,049,858 A | 4/2000 | Kolagotia et al. | 711/217 |
| 6,055,619 A | 4/2000 | North et al. | 713/36 |
| 6,058,409 A | 5/2000 | Kozaki et al. | 708/409 |
| 6,058,410 A | 5/2000 | Sharangpani | 708/551 |
| 6,058,464 A | 5/2000 | Taylor | 711/217 |
| 6,061,711 A | 5/2000 | Song et al. | 709/108 |
| 6,061,780 A | 5/2000 | Shippy et al. | 712/204 |
| 6,061,783 A | 5/2000 | Harriman | 712/224 |
| 6,076,154 A | 6/2000 | Van Eijndhoven et al. | 712/24 |
| 6,084,880 A | 7/2000 | Bailey et al. | 370/395 |
| 6,101,521 A | 8/2000 | Kosiec | 708/550 |
| 6,101,599 A | 8/2000 | Wright et al. | 712/228 |
| 6,115,732 A | 9/2000 | Oberman et al. | 708/625 |
| 6,128,728 A | 10/2000 | Dowling | 712/228 |
| 6,134,574 A | 10/2000 | Oberman et al. | 708/551 |
| 6,144,980 A | 11/2000 | Oberman | 708/627 |
| 6,145,049 A | 11/2000 | Wong | 710/267 |
| 6,181,151 B1 | 1/2001 | Wasson | 324/765 |
| 6,202,163 B1 | 3/2001 | Gabzdyl et al. | 713/324 |
| 6,205,467 B1 | 3/2001 | Lambrecht et al. | 709/108 |
| 6,209,086 B1 | 3/2001 | Chi et al. | 712/244 |
| 6,243,786 B1 | 6/2001 | Huang et al. | 710/262 |
| 6,243,804 B1 | 6/2001 | Cheng | 712/228 |
| 6,260,162 B1 | 7/2001 | Typaldos et al. | 714/55 |
| 6,282,637 B1 | 8/2001 | Chan et al. | 712/223 |
| 6,292,866 B1 | 9/2001 | Zaiki et al. | 710/264 |
| 6,295,574 B1 | 9/2001 | MacDonald | 710/261 |
| 6,300,800 B1 | 10/2001 | Schmitt et al. | 326/86 |
| 6,315,200 B1 | 11/2001 | Silverbrook et al. | 235/454 |
| 6,356,970 B1 | 3/2002 | Killian et al. | 710/269 |
| 6,377,619 B1 | 4/2002 | Denk et al. | 375/232 |
| 6,397,318 B1 | 5/2002 | Peh | 711/220 |
| 6,412,081 B1 | 6/2002 | Koscal et al. | 714/34 |
| 6,487,654 B2 | 11/2002 | Dowling | 712/244 |
| 6,523,108 B1 | 2/2003 | James et al. | 712/224 |
| 6,564,238 B1 | 5/2003 | Kim et al. | 708/513 |
| 6,633,970 B1 | 10/2003 | Clift et al. | 712/217 |
| 6,658,578 B1 | 12/2003 | Laurenti et al. | 713/324 |
| 6,681,280 B1 | 1/2004 | Miyake et al. | 710/261 |
| 6,694,398 B1 | 2/2004 | Zhao et al. | 710/260 |
| 6,728,856 B2 | 4/2004 | Grosbach et al. | 711/202 |
| 6,751,742 B1 | 6/2004 | Duhault et al. | 713/323 |
| 6,763,478 B1 | 7/2004 | Bui | 713/600 |
| 7,069,470 B2 * | 6/2006 | Wilding et al. | 714/34 |
| 2002/0194466 A1 | 12/2002 | Catherwood et al. | 712/241 |
| 2003/0093656 A1 | 5/2003 | Masse et al. | 712/241 |

FOREIGN PATENT DOCUMENTS

| | | |
|---|---|---|
| EP | 0 855 643 A1 | 7/1998 |
| EP | 0 992 888 | 12/2000 |
| EP | 0 992 889 | 12/2000 |
| JP | 01037124 A | 2/1989 |
| WO | 96/11443 | 4/1996 |

OTHER PUBLICATIONS

Turley J: "Balancing Conflicting Requirements When Mixing RISC, DSPs" Computer Design, Pennwell Publ. Littleton, Massachusetts, IS, vol. 37, No. 10, pp. 46, 48, 50-53, XP000860706 ISSN:0010-4566, Oct. 1998.

Levy M: "Microprocessor and DSP Technologies Unite for Embedded Applications" EDN Electrical Design News, Cahners Publishing Co., Newtown Massachusetts, US, No. Europe, pp. 73-74, 76, 78-80, XP000779113 ISSN: 0012-7515, Mar. 2, 1998.

Intel, Pentium Processor Family Developer's Manual, vol. 3: Architecture and Programming Manual, , pp. 3-1, 3-2, 3-15, 41-1 to 14-30, 18-7, and 25-289 to 25-292, 1995.

Intel, Embedded Intel486 Processor Family Developer's Manual, pp. 2-2, 3-17, 3-37, 4-5, 4-6, 10-1 to 10-12, 12-1 to 12-10, Oct. 1997.

Moore, M "Z80 Family Interrupt Structure". Barleywood (online), retrieved from the internet <URL: http://www.gaby.de/z80/1653.htm>, 1997.

PCT Search Report based on PCT/US02/16706, 6 pages, mailed Sep. 27, 2002.

PCT Search Report based on PCT/US02/16705, 7 pages, mailed Sep. 9, 2002.

PCT Search Report based on PCT/US02/16921, 4 pages, mailed Oct. 18, 2002.

SPARC, International, Inc., "The SPARC Architecture Manual", Version 8, pp. 1-303, 1992.

Weaver, et al. SPARC International, Inc. "The SPARC Arcitecture Manual", Version 9, pp. xiv, 137, 146-147, 200-204, 221-222, 234-236, 299, 1994-2000.

Free On-Line Dictionary of Computing (FOLDOC), htp://wombat.doc.ic.ac.uk/foldoc/Search term: program counter, 1995.

* cited by examiner

MODIFIED HARVARD ARCHITECTURE PROCESSOR HAVING DATA MEMORY SPACE MAPPED TO PROGRAM MEMORY SPACE WITH ERRONEOUS EXECUTION PROTECTION

CROSS REFERENCE TO RELATED APPLICATION

This application is a continuation of U.S. patent application Ser. No. 09/870,460, which was filed on Jun. 1, 2001, by Michael Catherwood entitled "Modified Harvard Architecture Processor Having Data Memory Space Mapped To Program Memory Space With Erroneous Execution Protection, which is now U.S. Pat. No. 7,007,172."

FIELD OF THE INVENTION

The present invention relates to a modified Harvard architecture processor having data memory space mapped to program memory space and having protection for erroneous execution of data entries in the program memory space.

BACKGROUND OF THE INVENTION

Processors, including microprocessors, digital signal processors and microcontrollers, operate by running software programs that are embodied in one or more series of program instructions stored in a memory. The processors run the software by fetching the program instructions from the series of program instructions, decoding the program instructions and executing them. In addition to program instructions, data is also stored in memory that is accessible by the processor. Generally, the program instructions process data by accessing data in memory, modifying the data and storing the modified data into memory.

One well-known architecture for processors is known as the Harvard architecture. In this architecture, data and program instructions are stored in separate memories that can be accessed simultaneously. Because of this simultaneous access, the Harvard architecture provides significant processing speed advantages over other architectures. A typical Harvard architecture processor that includes internal memory includes two separate memories, one for data, and one for program instructions. In order to expand the memory capacity of such a processor, memory external to the processor must be added. However, since a Harvard architecture processor has two separate memories, in order to expand both data memory and program instruction memory, two separate external memories must be added. This is a significant disadvantage when low-cost systems are being built.

A need arises for a processor having an architecture that provides the processing speed advantages of the Harvard architecture, but does not require two separate external memories in order to expand both data memory and program instruction memory. One solution to this problem is described in U.S. Pat. No. 6,728,856. The described processor has separate program memory space and data memory space, but provides the capability to map at least a portion of the program memory space to the data memory space. This allows most program instructions that are processed to obtain the speed advantages of simultaneous program instruction and data access. It also allows program memory space and data memory space to be expanded externally to the processor using only one external memory device that includes both program instructions and data.

However, a problem arises with this solution. Under some circumstances, the processor may fetch and attempt to execute an entry in the program memory space that has been mapped to the data memory space and which contains data, not a program instruction. Such a situation may occur, for example, as a result of a bug in the software that is being executed. Attempted execution of data that is not a program instruction may cause unpredictable results. A need arises for a technique by which attempted execution of data that is not a program instruction may be detected and recovered from.

SUMMARY OF THE INVENTION

The present invention is a method, and a processor implementing the method, that provides the capability to detect and recover from attempted execution of data that is not a program instruction in a processor in which at least a portion of a program memory space to a data memory space. This allows the processor to provide the speed advantages and expansion advantages without the risk of unpredictable program execution behavior.

According to the present invention, a method of operating a processor comprises the steps of: mapping at least a portion of a program memory space to a data memory space, storing an entry into the program memory space that is mapped to the data memory space, the entry comprising data and a protection opcode, fetching an entry from the program memory space, attempting to execute the fetched entry, trapping the protection opcode, vectoring to a trap handler, and executing the trap handler.

In one aspect of the present invention, the trap handler is an illegal instruction trap handler and the step of executing the trap handler comprises the steps of determining that the opcode is a protection opcode, and executing a software routine to handle the trap. The program memory space may be internal to the processor. The processor may be operably connected to an external memory device operable to store program instructions and data, the external memory device comprising program memory space.

In one aspect of the present invention, the trap handler is a protection trap handler. The program memory space may be internal to the processor. The processor may be operably connected to an external memory device operable to store program instructions and data, the external memory device comprising program memory space.

BRIEF DESCRIPTION OF THE FIGURES

The above described features and advantages of the present invention will be more fully appreciated with reference to the detailed description and appended figures in which.

DETAILED DESCRIPTION

Overview of Processor Elements

Figure 1:
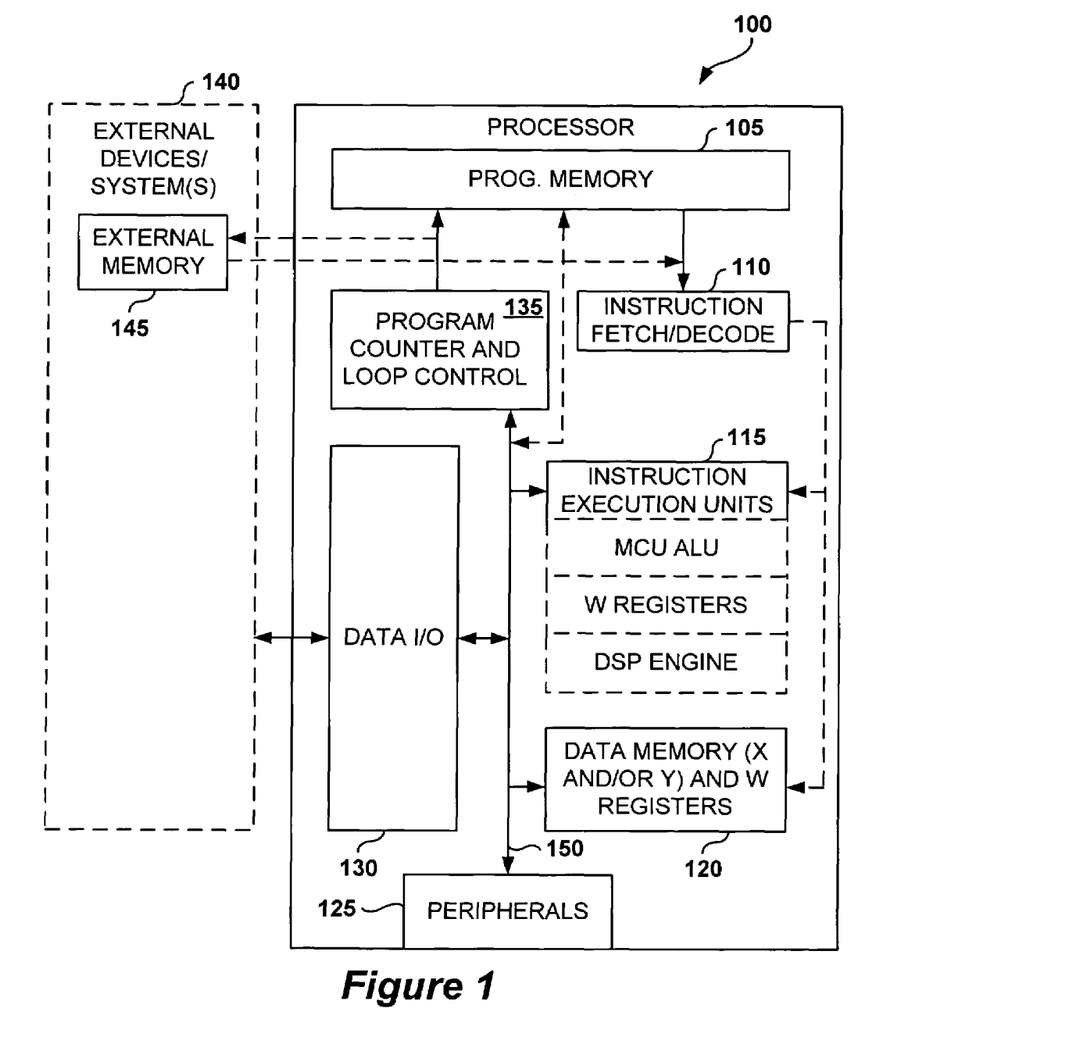
FIG. 1 depicts a functional block diagram of an embodiment of a processor chip within which the present invention may find application.

FIG. 1 depicts a functional block diagram of an embodiment of a processor chip within which the present invention may find application. Referring to FIG. 1, a processor 100 is coupled to external devices/systems 140. The processor 100 may be any type of processor including, for example, a digital signal processor (DSP), a microprocessor, a microcontroller, or combinations thereof. The external devices 140 may be any type of systems or devices including input/output devices such as keyboards, displays, speakers, microphones, memory, or other systems which may or may not include processors. Moreover, the processor 100 and the external devices 140 may together comprise a stand alone system.

The processor 100 includes a program memory 105, an instruction fetch/decode unit 110, instruction execution units 115 data memory and registers 120, peripherals 125, data I/O 130, and a program counter and loop control unit 135. The bus 150, which may include one or more common buses, communicates data between the units as shown.

The program memory 105 stores software embodied in program instructions for execution by the processor 100. The program memory 105 may comprise any type of nonvolatile memory such as a read only memory (ROM), a programmable read only memory (PROM), an electrically programmable or an electrically programmable and erasable read only memory (EPROM or EEPROM) or flash memory. In addition, the program memory 105 may be supplemented with external nonvolatile memory 145 as shown to increase the complexity of software available to the processor 100. Alternatively, the program memory may be volatile memory, which receives program instructions from, for example, an external non-volatile memory 145. When the program memory 105 is nonvolatile memory, the program memory may be programmed at the time of manufacturing the processor 100 or prior to or during implementation of the processor 100 within a system. In the latter scenario, the processor 100 may be programmed through a process called in-line serial programming.

The instruction fetch/decode unit 110 is coupled to the program memory 105, the instruction execution units 115, and the data memory 120. Coupled to the program memory 105 and the bus 150 is the program counter and loop control unit 135. The instruction fetch/decode unit 110 fetches the instructions from the program memory 105 specified by the address value contained in the program counter 135. The instruction fetch/decode unit 110 then decodes the fetched instructions and sends the decoded instructions to the appropriate execution unit 115. The instruction fetch/decode unit 110 may also send operand information including addresses of data to the data memory 120 and to functional elements that access the registers.

The program counter and loop control unit 135 includes a program counter register (not shown) which stores an address of the next instruction to be fetched. During normal instruction processing, the program counter register may be incremented to cause sequential instructions to be fetched. Alternatively, the program counter value may be altered by loading a new value into it via the bus 150. The new value may be derived based on decoding and executing a flow control instruction such as, for example, a branch instruction. In addition, the loop control portion of the program counter and loop control unit 135 may be used to provide repeat instruction processing and repeat loop control as further described below.

The instruction execution units 115 receive the decoded instructions from the instruction fetch/decode unit 110 and thereafter execute the decoded instructions. As part of this process, the execution units may retrieve one or two operands via the bus 150 and store the result into a register or memory location within the data memory 120. The execution units may include an arithmetic logic unit (ALU) such as those typically found in a microcontroller. The execution units may also include a digital signal processing engine, a floating point processor, an integer processor, or any other convenient execution unit. A preferred embodiment of the execution units and their interaction with the bus 150, which may include one or more buses, is presented in more detail below with reference to FIG. 2.

The data memory and registers 120 are volatile memory and are used to store data used and generated by the execution units. The data memory 120 and program memory 105 are preferably separate memories for storing data and program instructions respectively. This format is a known generally as a Harvard architecture. It is noted, however, that according to the present invention, the architecture may be a Von-Neuman architecture or a modified Harvard architecture, which permits the use of some program space for data space. A dotted line is shown, for example, connecting the program memory 105 to the bus 150. This path may include logic for aligning data reads from program space such as, for example, during table reads from program space to data memory 120.

Referring again to FIG. 1, a plurality of peripherals 125 on the processor may be coupled to the bus 125. The peripherals may include, for example, analog to digital converters, timers, bus interfaces and protocols such as, for example, the controller area network (CAN) protocol or the Universal Serial Bus (USB) protocol and other peripherals. The peripherals exchange data over the bus 150 with the other units.

The data I/O unit 130 may include transceivers and other logic for interfacing with the external devices/systems 140. The data I/O unit 130 may further include functionality to permit in circuit serial programming of the Program memory through the data I/O unit 130.

Figure 2:
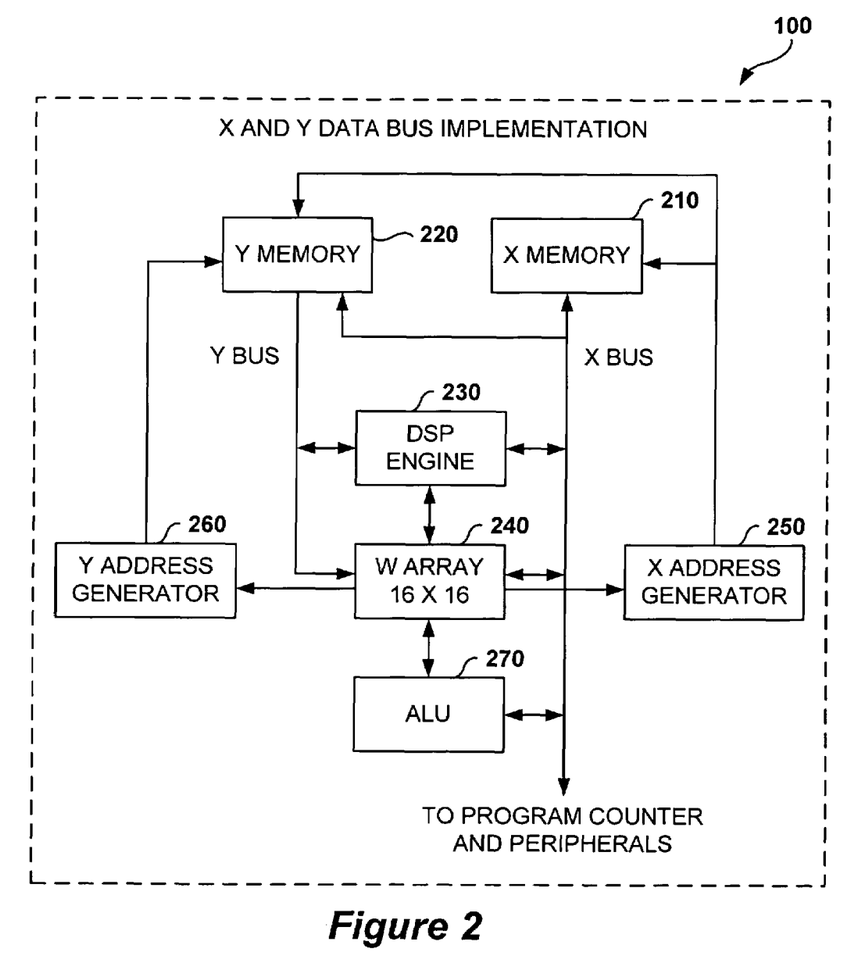
FIG. 2 depicts a functional block diagram of a data busing scheme for use in a processor 100, such as that shown in FIG. 1.

FIG. 2 depicts a functional block diagram of a data busing scheme for use in a processor 100, such as that shown in FIG. 1, which has an integrated microcontroller arithmetic logic unit (ALU) 270 and a digital signal processing (DSP) engine 230. This configuration may be used to integrate DSP functionality to an existing microcontroller core. Referring to FIG. 2, the data memory 120 of FIG. 1 is implemented as two separate memories: an X-memory 210 and a Y-memory 220, each being respectively addressable by an X-address generator 250 and a Y-address generator 260. The X-address generator may also permit addressing the Y-memory space thus making the data space appear like a single contiguous memory space when addressed from the X address generator. The bus 150 may be implemented as two buses, one for each of the X and Y memory, to permit simultaneous fetching of data from the X and Y memories.

The W registers 240 are general purpose address and/or data registers. The DSP engine 230 is coupled to both the X and Y memory buses and to the W registers 240. The DSP engine 230 may simultaneously fetch data from each the X and Y memory, execute instructions which operate on the simultaneously fetched data and write the result to an accumulator (not shown) and write a prior result to X or Y memory or to the W registers 240 within a single processor cycle.

In one embodiment, the ALU 270 may be coupled only to the X memory bus and may only fetch data from the X bus. However, the X and Y memories 210 and 220 may be addressed as a single memory space by the X address generator in order to make the data memory segregation transparent to the ALU 270. The memory locations within the X and Y memories may be addressed by values stored in the W registers 240.

Any processor clocking scheme may be implemented for fetching and executing instructions. A specific example follows, however, to illustrate an embodiment of the present invention. Each instruction cycle is comprised of four Q clock cycles Q1-Q4. The four phase Q cycles provide timing signals to coordinate the decode, read, process data and write data portions of each instruction cycle.

According to one embodiment of the processor 100, the processor 100 concurrently performs two operations—it fetches the next instruction and executes the present instruction. Accordingly, the two processes occur simultaneously. The following sequence of events may comprise, for example, the fetch instruction cycle:

Q1: Fetch Instruction
Q2: Fetch Instruction
Q3: Fetch Instruction
Q4: Latch Instruction into prefetch register, Increment PC The following sequence of events may comprise, for example, the execute instruction cycle for a single operand instruction:

Q1: latch instruction into IR, decode, and determine addresses of operand data
Q2: fetch operand
Q3: execute function specified by instruction and calculate destination address for data
Q4: write result to destination The following sequence of events may comprise, for example, the execute instruction cycle for a dual operand instruction using a data pre-fetch mechanism. These instructions pre-fetch the dual operands simultaneously from the X and Y data memories and store them into registers specified in the instruction. They simultaneously allow instruction execution on the operands fetched during the previous cycle.

Figure 3:
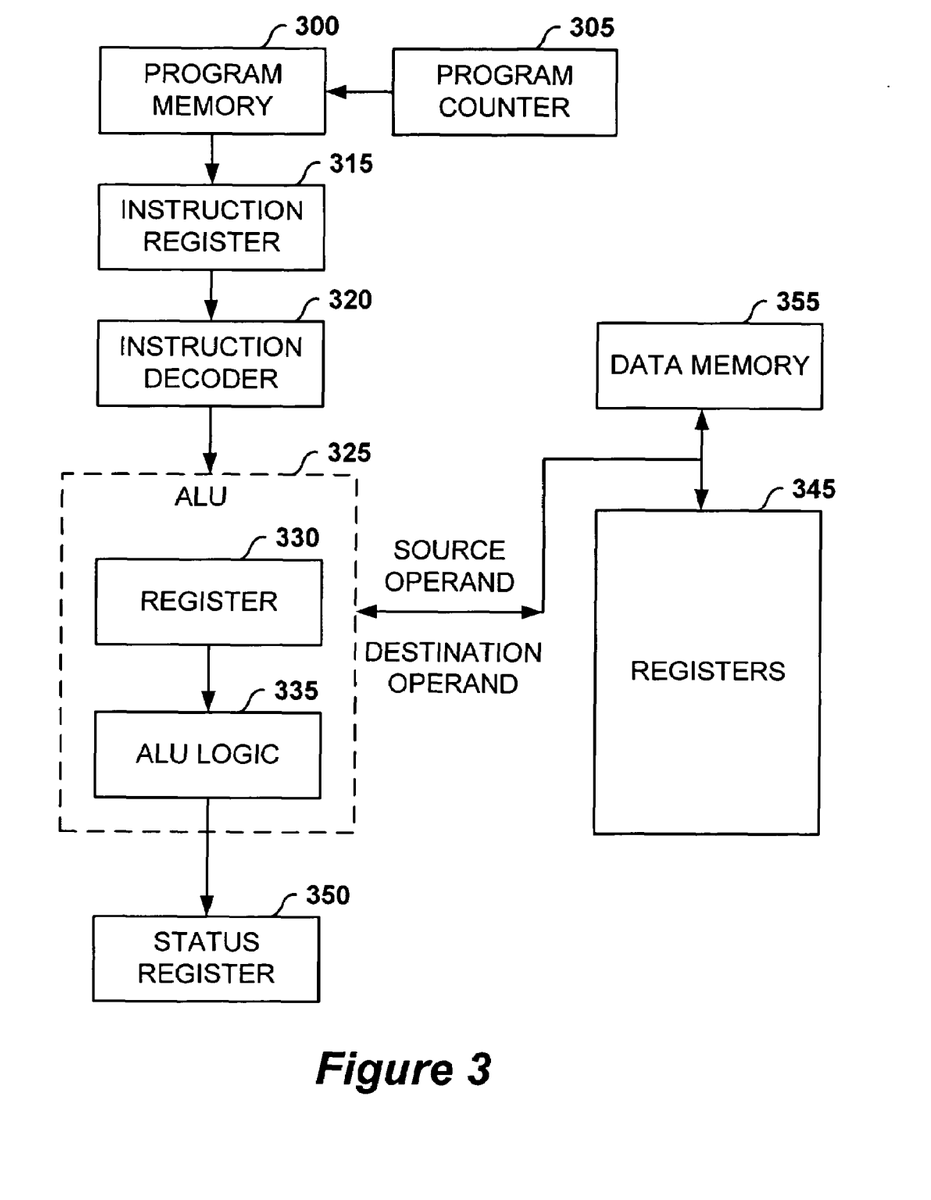
FIG. 3 depicts an exemplary memory map of a data space memory, which may be implemented in the processor shown in FIG. 2.

Q1: latch instruction into IR, decode, and determine addresses of operand data
Q2: pre-fetch operands into specified registers, execute operation in instruction
Q3: execute operation in instruction, calculate destination address for data Q4: complete execution, write result to destination An exemplary memory map of data space memory 300 is shown in FIG. 3. Data space memory 300 includes a plurality of blocks of memory, divided into X address memory and Y address memory. Typically, data space memory 300 is implemented as random access read-write memory (RAM), so as to allow data to be read and written as necessary. However, read-only memory (ROM) may also be advantageously used for at least a portion of data space memory 300. For example, constant data values, look up tables, etc., may be usefully stored in ROM. In the example shown in FIG. 3, X address memory includes memory blocks 302, 304, 306, and 308, while Y address memory includes memory block 310. Data space memory 300 is split into two blocks, X address memory and Y address memory. A key element of this architecture is that the Y address memory space is a subset of the X address memory space, and is fully contained within the X address memory space. In order to provide an apparent linear addressing space, the X and Y address memory spaces would typically have contiguous addresses, although this is not an architectural necessity.

In the example shown in FIG. 3, memory block 302 includes a block of contiguous memory, starting at data memory location 0×0000. Memory block 302 is reserved in X address memory space and is directly addressable using memory direct instructions. The remaining X address memory and Y address memory spaces are indirectly addressable using other instructions. In the example shown in FIG. 3, Y address memory space 310 is located between two blocks of X address memory space, block 304 and 306. However, this is only an example, as the Y address memory space 310 may be located anywhere within the non-reserved X address memory space. The partition between the X and Y address spaces is arbitrary and is determined by the memory decode shown in FIG. 2. Both the X and Y address generator can generate any effective address (EA) within the range of data memory space 300. However, accesses to memory addresses that are in the other address space, or to memory addresses that are not implemented with physical memory will return data of 0×0000 (all zeros).

Figure 4:
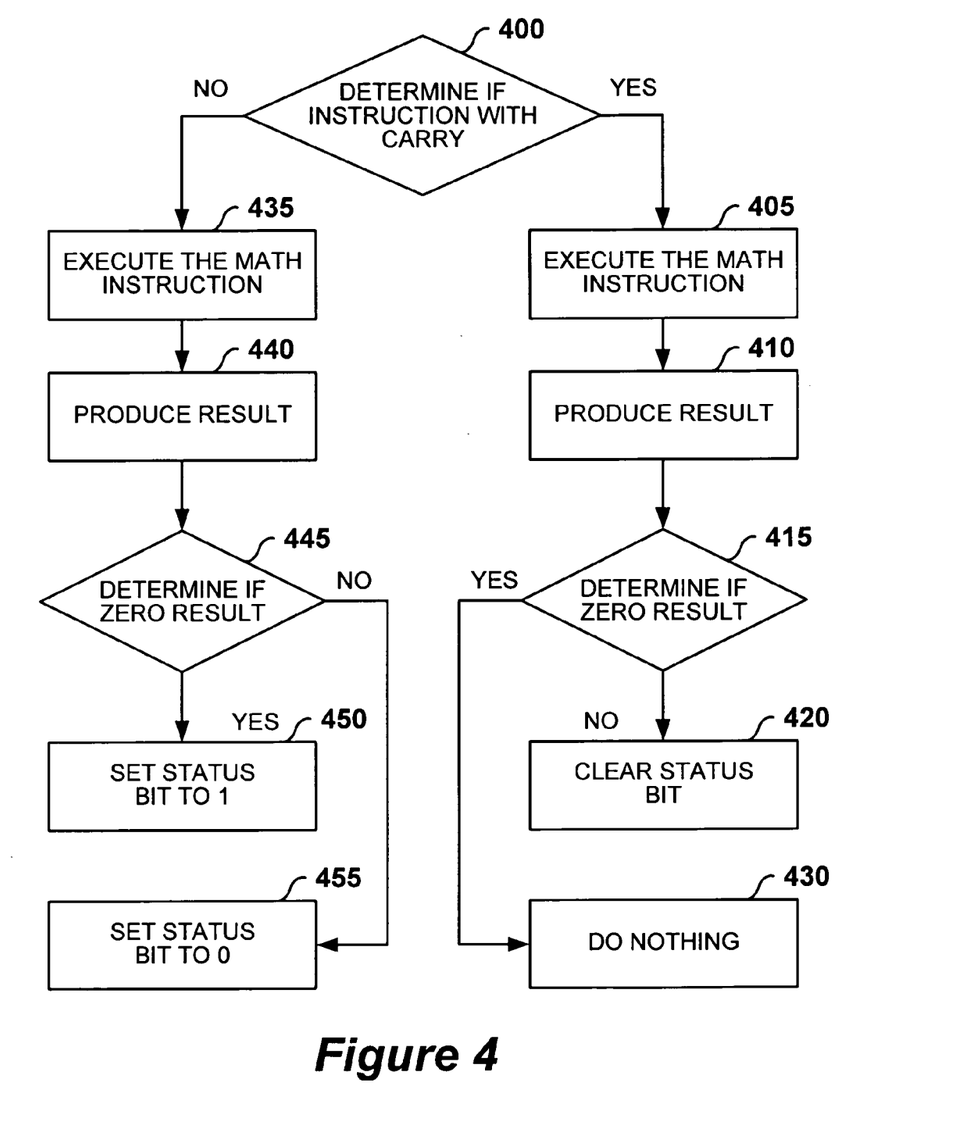
FIG. 4 depicts an exemplary block diagram of program memory space to data memory space mapping which may be implemented in the processor shown in FIG. 2, according to the present invention.

Memory block 308 is shown in FIG. 3 as being an X address memory block. Memory block 308, which includes at least a portion of data memory space 300, may be used as X address memory, Y address memory, or a mixture of X address memory and Y address memory. When used as X address memory, memory block 308 may be mapped into program memory space. This provides transparent access to constant data, such as stored constants, look up tables, etc., from the X address data memory space without the need to use special instructions. This feature allows the mapping of a portion of data memory space into an unused area of program memory, and since all unused internal addresses are mapped externally, to the external memory bus. This is shown in FIG. 4, which is an exemplary block diagram of the program memory space to data memory space mapping. Data memory space block 308, which is a portion of data memory space 300 is mapped to a data memory space page 402 in internal program memory space 404. The location of data memory space page 402 in internal program memory space 404 is specified by page register 406. Internal program memory space 404 is still used for program instruction access, as specified by program counter (PC) 408.

External memory device 410 is connected to the external memory bus 412 of the processor. External memory device 410 includes external program/data memory space 414. Since all unused internal addresses are mapped externally to the external memory bus, data memory space mapped page 402 is also mapped to external data memory space mapped page 416, which is located in external program/data memory space 412. If external memory device 410 is a RAM, then data may be read from and written to external data memory space mapped page 416. External program/data space 414 may also include external program memory space 418, which may be separate from external data memory space mapped page 416, or which may overlap with external data memory space mapped page 416.

Since the program memory space may include data that is used when a portion of the program memory space is mapped to the data memory space, there is some danger that the processor will erroneously fetch and attempt to execute that data. This may happen, for example, when there is a bug in a software program that is executing on the processor that sets the program counter (PC) to a memory location in the program memory space that happens to be storing data. This problem can arise when data is stored in internal program memory space and is even more likely to arise when data is stored in an external memory device. The present invention includes a mechanism for detecting such erroneous accesses and provides the capability to handle such errors.

Figure 5:
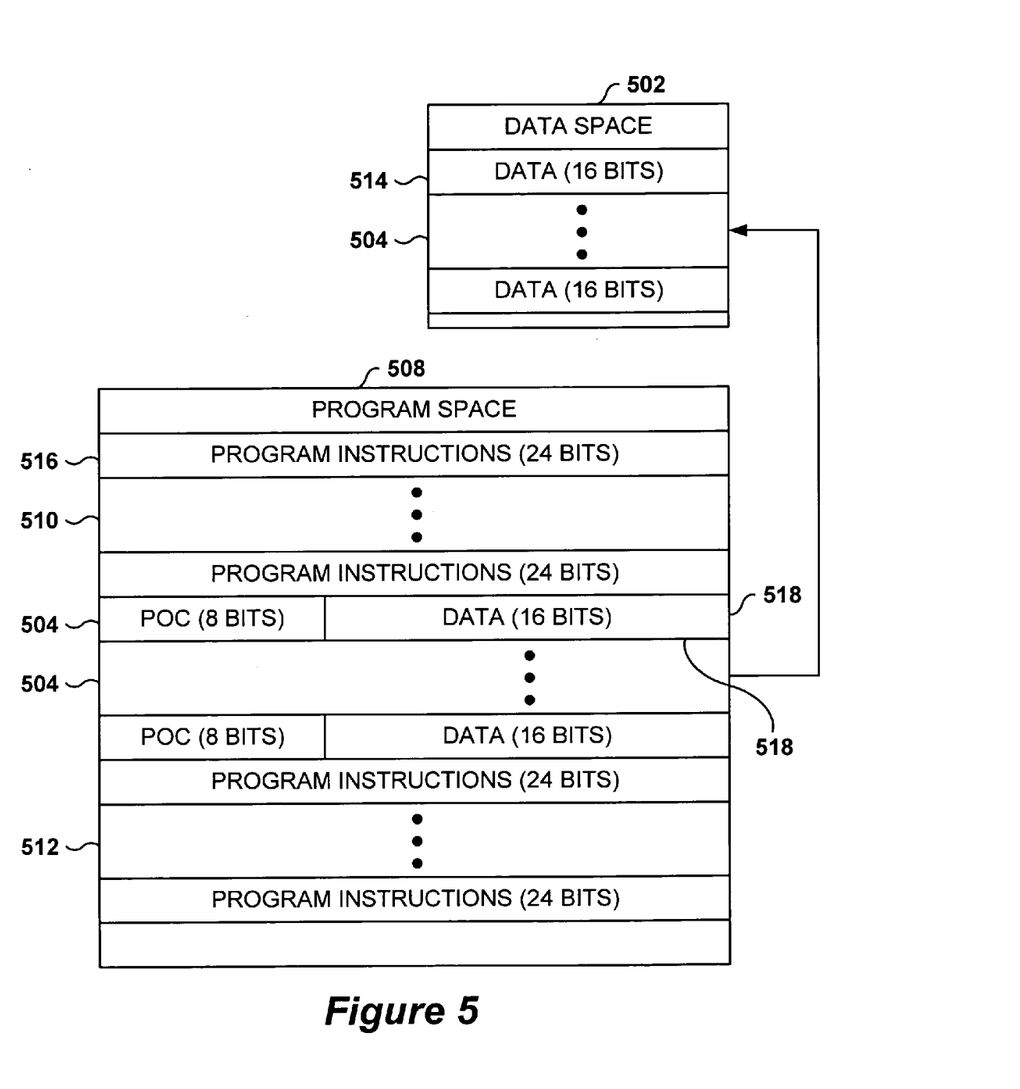
FIG. 5 depicts a block diagram of a data execution protection scheme, which may be implemented in the processor shown in FIG. 2, according to the present invention.

A block diagram of the data execution protection scheme of the present invention is shown in FIG. 5. Data memory space 502, including a plurality of data entries 504, is mapped from a data memory block portion 506 of program memory space 508. Program memory space 508 also includes one or more blocks of program instructions, such as program instruction blocks 510 and 512. As shown, each data entry, such as data entry 514, in data memory space 502 includes 16 bits of data. Each program instruction entry, such as program instruction entry 516, in program memory space 508 includes 24 bits of program instruction. The entries in data memory block 506 of program memory space 508, such as entry 518, are likewise 24 bits. Since a data entry only requires 16 bits, such as data portion 520 of entry 518, 8 bits of each entry in data memory block 506 are not used by data and may be used for other functions. In the present invention, this other portion is used to contain a protection opcode 522, which allows erroneous execution of a data entry to be detected.

Figure 6:
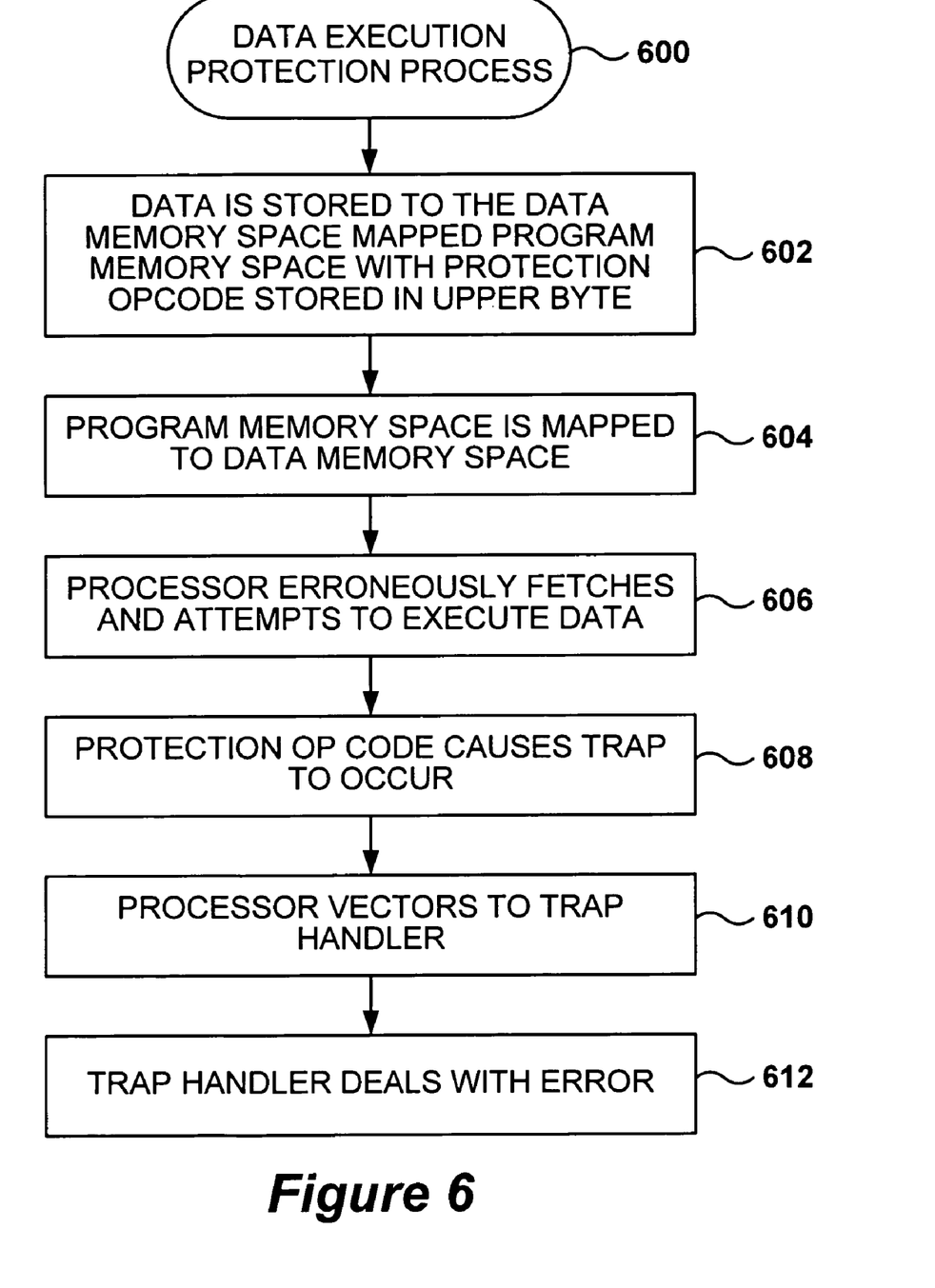
FIG. 6 depicts a processing flow diagram of a process for detection and handling of erroneous execution of a data entry, which may be implemented in the processor shown in FIG. 2, according to the present invention.

A process 600 for detection and handling of erroneous execution of a data entry is shown in FIG. 6. The process begins with step 602, in which data is stored to the data memory space that was mapped from program memory space. This data is stored to the lower 16 bits of each entry that is used. In addition to the data that is stored, a protection opcode is stored to the upper 8 bits (byte) of each data entry that is used. Typically, the protection opcode will be stored when the data entry is stored. For example, since program memory is typically implemented using non-volatile memory, the program instructions stored in the program memory are stored to the program memory during the production process. The protection opcodes may easily be stored to the program memory by this step in the production process. This is true both for internal program memory and for non-volatile external memory.

In step 604, program memory space is mapped to data memory space by issuance of the proper program instructions. In step 606, the processor erroneously fetches and attempts to execute data that was stored in an entry in data memory space that was mapped from program memory space. Since the processor is fetching a program instruction, the processor treats the entry as a program instruction entry and fetches the entire 24 bits of the entry. The upper 8 bits of the entry are the protection opcode, while the lower 16 bits are the data in the entry. The processor attempts to execute the fetched entry, and in particular attempts to decode the protection opcode. In step 608, this attempted decode of the protection opcode causes a processor trap to occur. A trap can be considered to be a non-maskable, nestable interrupt. They provide a means by which erroneous operation can be corrected during software debug and during operation of the software. Upon occurrence of a trap, the execution flow of the processor is vectored to a trap handler in step 610. That is, the program counter of the processor is loaded with a value that points to the trap handler. The trap handler is a software routine that takes the appropriate corrective action upon occurrence of the trapped condition. The value is stored in an exception vector table that includes vectors for a variety of exception conditions, such as reset, stack overflow, address error, illegal instruction trap, arithmetic error, etc. Each entry in the exception vector table points to an exception handler that takes the appropriate action upon occurrence of the corresponding exception. In step 612, the trap handler deals with the error. Typically, the trap handler simply forces a reset of the processor. This would be done, for example, in an implementation in which a stand-alone application is executing in the processor. Since an attempt to execute a data entry is likely a result of a serious program error, performing a reset of the processor is often the best way of recovering from such an error. In an implementation in which there is an operating system controlling the processor, it may be possible to simply terminate the application program that caused the error and allow the operating system to recover from the error.

In a preferred embodiment, the illegal instruction trap vector is used to vector the processor to a routine that handles the attempted execution of a protection opcode. The protection opcode must be one of the possible 8 bit opcodes that is not used by any instruction of the processor. Attempted execution of this opcode will result in an illegal instruction trap. The illegal instruction trap handler must then examine the opcode that caused the illegal instruction trap, determine that the opcode is the protection opcode, and execute the appropriate software routines to handle the trap, which typically includes recovering from the error condition. Alternatively, there may be a defined protection trap that is separate from the illegal instruction trap. Attempted execution of the protection opcode will cause a protection trap to occur, rather than a general illegal instruction trap. Since the processor will have already determined the opcode that was attempted to be executed was the protection opcode, the protection trap then need only execute the appropriate software routines to handle the error condition.

In the embodiment described above, internal program memory is organized as a plurality of 24 bit entries, each of which may contain a 16 bit data entry and an 8 bit protection opcode. The present invention also contemplates a number of additional and alternative embodiments. For example, an external memory may be used in which 24 bit entries are stored. In this embodiment, a 24 bit entry may contain a 16 bit data entry and an 8 bit protection opcode. If the external memory is a non-volatile memory, then the data entries and protection opcodes, along with any program instructions, may be stored in the external memory during the production process. If the external memory is a volatile memory, then the data entries and the protection opcodes must be stored to the external memory by the processor.

Alternatively, data entries may be stored in the external memory as 16 bit data entries, without protection opcodes. In this embodiment, the external memory may be connected to the processor using a memory bus configuration that is aware that the data entries are 16 bits. For example, the memory bus connected to the external memory may be 16 bits wide, rather than the 24 bits wide that would be needed for program instructions. As another example, the address range of the external memory that is mapped to data memory may be used by the processor to identify a portion of the external memory that is storing data entries rather than program entries. In either example, the processor can detect an attempted program instruction access of the external memory or the portion of external memory that is storing data entries. Upon detection of such an attempted access, the processor may directly perform a protection trap. Alternatively, the processor may simply force a protection opcode onto the top 8 bits of the program instruction bus, which will also cause a protection trap to be performed.

While specific embodiments of the present invention have been illustrated and described, it will be understood by those having ordinary skill in the art that changes may be made to those embodiments without departing from the spirit and scope of the invention. For example, the present invention has been described in terms of 16 bit data entries, 24 bit program instruction entries, and 8 bit opcodes. However, one of skill in the art will recognize that such specific values are only examples, and that other arrangements and numbers of bits may be used without departing from the spirit and scope of the invention. The present invention contemplates any and all such alternative arrangements and numbers of bits.

What is claimed is:

1. A method of operating a processor comprising the steps of: mapping at least a portion of a program memory space to a data memory space; storing an entry into the program memory space that is mapped to the data memory space, the entry comprising data and a protection opcode; fetching an entry from the program memory space; attempting to execute the fetched entry; trapping the protection opcode; vectoring to a trap handler; and executing the trap handler.

2. The method of claim 1, wherein the trap handler is an illegal instruction trap handler and the step of executing the trap handler comprises the steps of: determining that the opcode is a protection opcode; and executing a software routine to handle the trap.

3. The method of claim 1, wherein the trap handler is a protection trap handler.

4. The method of claim 3, wherein the program memory space is internal to the processor.

5. The method of claim 4, wherein the processor is operably connected to an external memory device operable to store program instructions and data, the external memory device comprising program memory space.

6. A processor comprising circuitry operable to: map at least a portion of a program memory space to a data memory space; store an entry into the program memory space that is mapped to the data memory space, the entry comprising data and a protection opcode; fetch an entry from the program memory space; attempt to execute the fetched entry; trap the protection opcode; vector to a trap handler; and execute the trap handler.

7. The processor of claim 6, wherein the trap handler is an illegal instruction trap handler and the execution of the trap handler comprises: determining that the opcode is a protection opcode; and executing a software routine to handle the trap.

8. The processor of claim 6, wherein the trap handler is a protection trap handler.

9. The processor of claim 8, wherein the program memory space is internal to the processor.

10. The processor of claim 9, wherein the processor is operably connected to an external memory device operable to store program instructions and data, the external memory device comprising program memory space.

* * * * *